United States Patent [19]
Hemperly, Jr. et al.

[11] 4,260,273
[45] Apr. 7, 1981

[54] SEAM SEALER APPLICATOR ATTACHMENT

[75] Inventors: William R. Hemperly, Jr., Lancaster, Pa.; Harry A. Singer, Cincinnati, Ohio

[73] Assignee: Armstrong Cork Company, Lancaster, Pa.

[21] Appl. No.: 75,011

[22] Filed: Sep. 13, 1979

[51] Int. Cl.³ .................. E04F 21/20; B43M 11/02
[52] U.S. Cl. .................................. 401/48; 222/611; 401/193; 401/261
[58] Field of Search .................. 222/191, 611; 401/5, 401/137, 9, 14, 131, 48, 261, 193, 265

[56] References Cited
U.S. PATENT DOCUMENTS

| 2,549,722 | 4/1951 | Sweet et al. | 401/48 |
| 3,349,971 | 10/1967 | Poletajeu | 222/191 X |
| 3,589,820 | 6/1971 | Ward | 401/48 |
| 3,594,089 | 7/1971 | Powell | 401/48 |
| 3,627,435 | 12/1971 | Hendershot | 401/265 |
| 3,653,560 | 4/1972 | Adams et al. | 401/48 X |
| 3,981,595 | 9/1976 | Blake | 401/48 |

FOREIGN PATENT DOCUMENTS

| 986266 | 7/1951 | France | 401/48 |
| 1159307 | 6/1958 | France | 401/48 |

Primary Examiner—Steven A. Bratlie

[57] ABSTRACT

An attachment for applicators used to apply liquid adhesive to a seam between adjacent edges of floor covering. The attachment comprises a support plate having a generally rectangular main body portion, an integral collar extending upwardly from the top edge thereof, and a pair or cylindrical rollers each rotatably mounted between pairs of projections which extend downwardly from the bottom of the main body portion. The collar of the attachment is adapted to be adjustably mounted on the cylindrical nozzle of a seam sealer dispensing head and held in place thereon by appropriate fastening means. In use, the attachment provides sidewise stabilization for the applicator and a means for setting and maintaining the desired angle thereof relative to the surface of the floor covering as it is moved along the seam therein.

1 Claim, 2 Drawing Figures

SEAM SEALER APPLICATOR ATTACHMENT

CROSS REFERENCE TO RELATED APPLICATION

This invention constitutes an improvement on the seam sealer dispensing head disclosed in U.S. Pat. No. 3,653,560 issued Apr. 4, 1972 to William H. Adams and Charles D. Painter.

BACKGROUND OF THE INVENTION

This invention relates generally to seam sealer applicators and more particularly, to an attachment therefor which is adapted to be mounted on a nozzle thereof to stabilize, support, and maintain the applicator, in use, at a predetermined angle to the surface of the floor covering.

DESCRIPTION OF THE PRIOR ART

A seam sealer dispensing head is disclosed in U.S. Pat. No. 3,653,560 which is designed to be fastened to a plastic squeeze bottle or the like, which can be worked by hand to force the adhesive from the bottle through the nozzle to the area to be sealed. The nozzle has fins or guides which serve to properly open the seam and redirect the entry of adhesive from the nozzle into the area between two pieces of sheet flooring. The fins or guides are mounted relative to flat surfaces which are designed to guide the nozzle structure relative to the plane of the flooring and enable the nozzle structure to easily slide across the flooring. The opening in the nozzle is positioned relative to the fin and on a face structure which will permit the dispensing of the proper size bead of adhesive so that excess adhesive is not dispensed.

Another seam sealing applicator is disclosed in U.S. Pat. No. 3,594,089. The applicator of this patent is also designed for use in conjunction with a handheld fluid container and comprises an applicator cap and nozzle assembly adapted to be mounted thereon. The tubular nozzle is provided with vertical and horizontal fins. In use, the bottom fin serves to part the adjacent sheet edges as the seam sealer is being applied. The upper fin is used as a sighting element for the installer, enabling him to more quickly and accurately draw the applicator nozzle along the seam. The horizontal fins on each side serve to hold the two adjacent sheet material surfaces level with one another and act as a stop which prevents the lower fin from being depressed too far between the adjacent floor covering sheets.

In U.S. Pat. No. 3,349,971, there is disclosed an edge sealer for pile fabric comprising a base member of generally triangular configuration and having a plow or keel on the underside thereof which extends outwardly beyond the forward edge of the base plate and is elevated to protrude visibly thereabove. Means is provided for mounting a liquid adhesive container on top of the base member. The container is provided with a closure and a tubular nozzle extending therefrom for the application of adhesive to the seam. An upstanding bracket is provided on the base plate and the container is rigidly clamped to the bracket by means of a bifurcated plate secured in position by a thumb screw. The prongs of the bifurcated plate extend partially around the cap to securely hold the cap and reservoir in position. It is stated that the length of the nozzle can be adjusted to position bead in the most satisfactory manner depending upon the thickness and height of the pile on the fabrics. However, no disclosure is made of how this may be accomplished. It is assumed, therefore, that a longer or shorter nozzle may be used to accomplish this.

U.S. Pat. No. 3,589,820 relates to a dispensing applicator adjustment means for use with dispensing devices for viscous liquids, such as glues or adhesives. The dispenser has a body portion which includes a reservoir for the adhesive and a dispensing closure cap which has an adhesive exit port and adjustment means to vary the distance of the adhesive closure port from a bearing surface either on the work piece to which the adhesive is to be applied or physically related to the work piece so that when the adjustment means, which comprises an extension screw, is lengthened, the bead will be relatively higher and when the adjustment is shortened, the bead will be relatively lower. The adjusting screw is provided with a blind head which is adapted to bear against a bearing surface on, or relative to, a work piece and glide smoothly thereover.

The devices disclosed by the prior art offers no solution to some of the problems encountered in the use of seam sealing applicators. Among the features of such a device which would be highly desirable, effective, and useful is the provision of means on such a device which would enable it to be set at the desired angle with respect to the surface of the floor covering and to be maintained at the preset angle throughout its use without the need for judgment and control which normally would be required and possessed only by one experienced in this line of work. Other features which would be desirable are improved sidewise stabilization of the device by means which would eliminate marking of a floor covering surface and provide smoother operation through the elimination of friction. Additionally, adjustable control of the height or location of the bead of adhesive in the seam is to be desired.

SUMMARY OF THE INVENTION

The primary object of the invention is to provide an uncomplicated, inexpensive, and easy-to-operate attachment for seam sealer applicators which will provide the features indicated above as being desirable in such a device. These things are accomplished by the provision of an attachment adapted to be mounted on the nozzle of a seam sealer applicator such as that shown in U.S. Pat. No. 3,653,560, the disclosure of which is incorporated herein by reference. The attachment comprises a support plate with an integral collar extending upward from the top edge thereof and means for adjustably and removably securing the collar on the elongated body portion of the nozzle. A pair of rollers, which are rotatably mounted between a pair of projections extending downwardly from each side of the bottom edge of the support plate together with the tapered nose portion of the nozzle on the seam sealer dispensing head of U.S. Pat. No. 3,653,560 provides a three point contact means for stabilizing, and supporting the applicator and, together with the adjustably mounted collar on the nozzle, provides means for maintaining the seam sealing device at a predetermined desired angle to the surface of the floor covering with the opening in the extreme end of the nozzle positioned in the desired relationship to the seam to be sealed. In use, the rollers eliminate marking of the floor covering surface and eliminate friction. The length of the cylindrical rollers and their position well out to the sides of the nozzle further provide stability without undesirable bulk and nonflexibility, sacrificing of choice of angles of the device with respect to the surface of the floor covering, and/or, choice of the height or location of the bead of adhesive applied to the seam. Moving of the seam sealer applicator attachment of this invention from a rearward to a more forward position on the applicator nozzle results in a tilting of the parting fin provided on the end of the nozzle and a facing of the opening in the end of the nozzle at a sharper downward angle with respect to the surface of the floor covering, thereby, causing the bead of adhesive to be deposited in the seam at a greater depth.

DESCRIPTION OF THE PREFERRED EMBODIMENT

Figure 1:
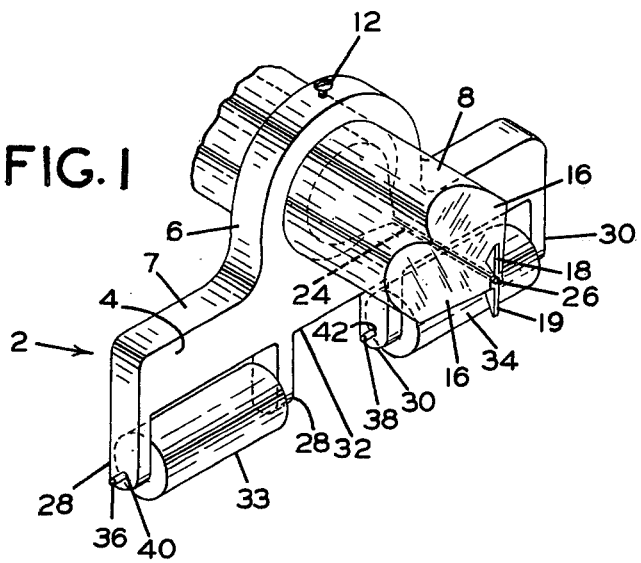
FIG. 1 is an enlarged isometric view of the seam sealer applicator attachment of this invention mounted on the nozzle of the applicator.

Referring to FIG. 1, the attachment assembly 2 has a substantially rectangular main body portion 4 and an integral collar 6 extending upwardly from the top edge 7 thereof. As shown, the attachment assembly 2 is mounted on the nozzle 8 of the seam sealer dispensing head assembly 10 (see FIG. 2) and adjustably held thereon by fastening means 12. The nozzle 8 has a base portion 14 which may be fastened by any appropriate means to the body of a plastic squeeze bottle or the like containing the adhesive that is to be dispensed. The other end of the nozzle 8 is tapered as at 16 and has fins 18 and 19 protruding from the upper and lower tapered surfaces 16. The fins 18 and 19, respectively, serve as a guide means and a seam opening structure for the seam sealing applicator in use.

Figure 2:
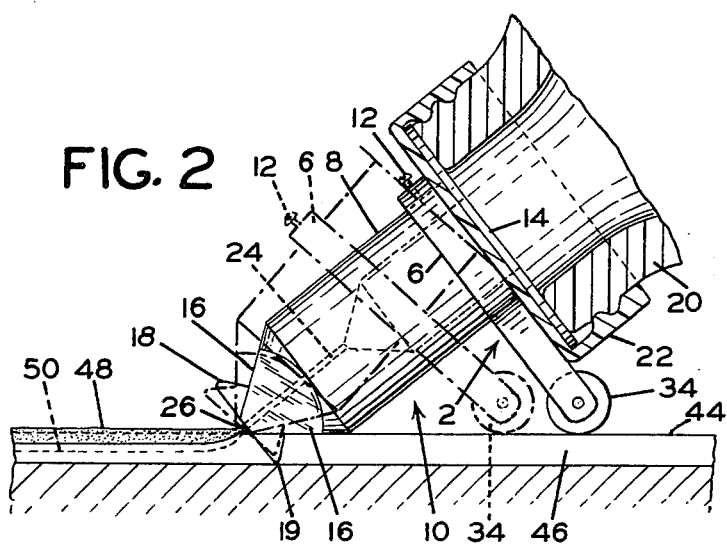
FIG. 2 is an enlarged side elevational view showing the applicator of FIG. 1 and the means for mounting it on the neck portion (partially broken away and in section) of a container for liquids and illustrating its use in applying seam sealing material to a seam.

As shown in FIG. 2, one means of mounting the seam sealer applicator assembly 10 on a liquid adhesive container such as shown at 20 partially broken away and in section is by means of a screw cap such as that shown in section at 22. The dispensing nozzle has a passageway structure 24 which passes from the base region through the length of the body portion to the dispensing hole 26.

As best seen in FIG. 1, pairs of longitudinally spaced projections 28 and 30 are provided on each side of the bottom edge 32 of the main body portion 4 and extend downwardly therefrom. Mounted between each pair of projections 28 and 30 are rollers 33 and 34. Rollers 33 and 34 are rotatably mounted between projections 28 and 30 by means of stub shafts 36 and 38 in openings 40 and 42 in projections 28 and 30 as shown in FIG. 1. Obviously, the other end of each of the rollers not visible in FIG. 1 is mounted in a similar manner.

As described in U.S. Pat. No. 3,653,560 the seam sealer applicator is used to apply sealing material to adjacent edge portions of surface covering. Normally, the two adjacent edges of the seam would be very close together and any space therebetween would be so minute that it would be very difficult to force the sealing material thereinto. In use, the seam sealing dispensing head of U.S. Pat. No. 3,653,560 is normally positioned with the tapered surface 16 of the nozzle 8 flush with the surface 44 of the surface covering 46. As shown in FIG. 2, when the dispensing head is so positioned, the main body portion of the dispensing head 8 is positioned at an angle with respect to the surface 44 of the surface covering 46. Also, as shown in FIG. 2, when the dispensing head is so positioned, the fin 19 projects downwardly into the seam between the floor coverings adjacent edges. For illustrative purposes and clarity only one of the edges is shown. The fin 19 must be inserted into this space and due to the resilient nature of the floor covering, force back the two edges of the floor covering to provide an opening roughly equal to the width of the fin so that an open seam is provided for entry of the sealing material. As shown at 26, a centrally located dispensing hole is provided in the tapered end portion of the nozzle 8 between fins 18 and 19. Sealing material 48 is dispensed from the opening 26 which is connected by passageway 24 to the contents of the container 20. The upper fin 18 will serve the function of visibly assisting the user in keeping the tool in alignment with the seam.

Although as can be seen in FIG. 2, the tapered end portion of the dispensing head 8 does provide some stabilization for the device in use, it can also be seen from this figure that without the attachment of this invention, if it were desired to position the device at a different angle to the surface of the floor covering, the stabilization provided by the tapered surface 16 would be lost.

As further shown in FIG. 2 in phantom lines, the attachment of this invention may be adjusted on the dispensing head to hold it at an angle (or angles) other than the angle where the tapered surface 16 is flush with the surface 44 of the floor covering. This may be desirable for example to obtain a deposition of the sealing material into the seam to a depth such as shown in dotted lines at 50 in FIG. 2. The adjustment is very easily accomplished by merely loosening the fastening means 12 and sliding the collar 6 forwardly along the dispensing head 8 and then retightening the fastening means 12.

This attachment permits making a desired choice of angles of the dispensing head 8 with respect to the surface 44 of the floor covering 46. Further, as can be seen, especially in FIG. 1, the location of the rollers 33 and 34, the length of the rollers, and the fact that they are located or spaced well outwardly on each side of the dispensing head 8 results in excellent sidewise stabilization of the applicator. This, together with the fact that a portion of the tapered end 16 of the dispensing head 8 is in contact with the surface 44 of the floor covering 46 in use, a three-point contact support means is provided which enables the chosen angle of the applicator with respect to the surface 44 of the floor covering to be maintained and eliminates the need for judgment and control which normally would be required and possessed only by one highly skilled in this line of work. The rollers 33 and 34 also aid in keeping the adjacent edges of the surface covering in a flat plane. Further, rollers 33 and 34 eliminate or greatly reduce the tendency for even a skilled mechanic to tilt the applicator to one side or the other during use. Such tilting would cause the fin 19 to lift one of the adjacent edges of the surface covering and cause more adhesive to flow to that side. This, in turn, results in a raised edge of the seam which is not only poorly sealed, but due to its being raised, forms a lip or ledge which tends to collect dirt and results in an adverse visual effect. It will further be noted that due to the use of rollers, the possibility of marking the surface 44 of the floor covering when using the applicator is eliminated and, due to the elimination of friction, the applicator is much easier to use and control. Further, the attachment is uncomplicated, inexpensive, and easy to use and may be readily removed and repeatedly used on different applicators.

What is claimed is:

1. In a device for applying liquid adhesive to a seam between adjacent edges of floor covering comprising a container for liquids, a nozzle, and means for fastening said nozzle to said container, said nozzle having an elongated body portion with a centrally located passageway extending completely through the length thereof, the end of the body opposite from the fastening means being tapered and having an opening at the extreme end thereof interconnected with the passageway through the elongated body portion of the nozzle and, a parting fin located closely adjacent to and below said opening and extending downwardly from the tapered end of said nozzle at right angles to the longitudinal axis thereof, the improvement comprising a support plate having a one-piece generally rectangular main body portion with flat front and rear surfaces, an integral collar extending upwardly from the top edge thereof, means for adjustably and removably securing said collar on the elongated body portion of said nozzle so that the main body portion of said support plate extends downwardly below said nozzle in a plane perpendicular to the longitudinal axis thereof, mounting means comprising integral pairs of longitudinally spaced projections on each side of the bottom edge of the main body portion of the support plate, and a pair of cylindrical rollers one of which is mounted between each pair of projections, said rollers being rotatably positioned on the mounting means and being so mounted and each having a diameter sufficient to cause the outer surface thereof to extend outwardly beyond the thickness and the lower edge of the projections whereby, in use, the rollers and the tapered end of the nozzle provide a three-point contact means for stabilizing, supporting, and maintaining the seam sealing device at a predetermined desired angle to the surface of the floor covering with the opening in the extreme end of the nozzle positioned in the desired relationship to the seam to be sealed.

* * * * *